United States Patent [19]

Cosman et al.

[11] Patent Number: 4,767,237

[45] Date of Patent: Aug. 30, 1988

[54] MARKING TAPE WITH WIRE CONDUCTORS AND METHODS FOR USE

[75] Inventors: Armond D. Cosman, Austin; Joe T. Minarovic, Georgetown, both of Tex.

[73] Assignee: Minnesota Mining and Manufacturing Company, St. Paul, Minn.

[21] Appl. No.: 153,513

[22] Filed: Feb. 8, 1988

Related U.S. Application Data

[63] Continuation of Ser. No. 900,453, Aug. 26, 1986.

[51] Int. Cl.[4] .......................... F16L 57/00; G01V 3/08
[52] U.S. Cl. ...................................... 405/157; 174/37; 324/326; 324/510; 405/154
[58] Field of Search ................ 405/157, 176; 324/326, 324/327, 328, 329, 330, 331, 67, 51, 52; 340/652, 540, 550; 174/37, 117 F

[56] References Cited

U.S. PATENT DOCUMENTS

| Re. 30,393 | 9/1980 | Sherlock | 174/37 |
| 3,568,626 | 3/1971 | Southworth | 405/157 |
| 3,633,533 | 1/1972 | Allen | 405/157 |
| 3,718,113 | 2/1973 | Schertler et al. | 405/157 |
| 4,119,908 | 10/1978 | Cosman et al. | 324/326 |
| 4,151,458 | 4/1979 | Seager | 324/329 |
| 4,625,074 | 11/1986 | Cox | 174/117 F |

Primary Examiner—Dennis L. Taylor
Attorney, Agent, or Firm—Donald M. Sell; Walter N. Kirn; Robert L. Marben

[57] ABSTRACT

A marking tape that is positioned underground above utility lines wherein the marking tape carries a pair of closely spaced, parallel, insulated conductors that extend the length of the tape and at least one other insulated conductor extending the length of the tape which is separated from the pair of conductors at a distance that is greater than the distance between the conductors of the pair of conductors. Passive markers having a resonant circuit can be selectively placed along the tape wherein the resonant circuit is electromagnetically coupled to the pair of conductors and the other conductor. The other insulated conductor can be one of a pair of conductors similar to the other pair of conductors. A method is disclosed whereby the making tape can be electromagnetically traced with the position of the passive markers established. A method is also disclosed for determining the distance to a break in the tape which causes the pair of conductors to be severed.

12 Claims, 3 Drawing Sheets

MARKING TAPE WITH WIRE CONDUCTORS AND METHODS FOR USE

This is a continuation of application Ser. No. 900,453 filed Aug. 26, 1986.

TECHNICAL FIELD

The invention presented herein relates to marking tape structures that are positioned underground above utility lines and the method of using them and, in particular, to such tape structures that allow a method to be used to trace the tape structure and specific points along the tape after it has been placed underground and that allows a method to be used to locate any break in the tape by measurements made at a point remote from the break.

BACKGROUND ART

Telephone and pipeline companies, electric, water and gas utilities and others that have underground lines or subterranean installations have need for locating and identifying underground lines and installations to service and maintain them. Such companies also have to guard against accidental damage to the underground lines and installations when it is necessary to carry out repairs or when any excavation is undertaken by others who are not aware of the underground lines and installations.

Marking tapes such as those described in U.S. Pat. Nos. 3,115,861; 3,282,057; 3,504,503 and 3,633,533 have been used. Such tapes are colored, printed and are made of various plastic materials. The tapes are designed so they will tear when pulled up, for example, by a mechanical digger used in an excavation operation. When so constructed, the presence of such tapes beneath the surface of the earth cannot be detected by any detecting instruments and are revealed only in connection with a digging operation. U.S. Pat. No. 3,633,533 addressed this detection problem by adding a flexible, metal film to the tape structure wherein the metal film is protected from moisture, oxidation or other deterioration when buried in soil. It has been found that such tapes must be buried within about one foot of the earth's surface and, except for being exposed when dug up, can be detected only by a metal detector. While it is indicated such tapes are traceable with standard radio frequency (RF) path tracing equipment, the tapes can in fact only be traced for short distances depending upon the frequencies used. The distances may be a few hundred feet or less than one hundred feet. Further, detection of the location of a break in the tape at a point remote from the break is not possible with the marking tape structure of U.S. Pat. No. 3,633,533.

A single tracing wire is sometimes buried with a utility line wherein ground is used as a return with an alternating current signal applied between the wire and ground when the wire is to be traced. An electromagnetic or "H" field is produced along the wire by the current flow in the wire. This "H" field is detected by a receiver carried by an operator above the wire to trace the wire. The use of a common mode current, i.e., a common return path for the current, in this case via ground, results in ambiguities caused by adjacent structure and phantom cables. Such an arrangement does not provide the necessary structure for detection of a break in the wire from a point remote from the break and does not provide an early visible warning to someone digging where the utility line is buried as in the case of the marking tapes.

U.S. Pat. No. 4,119,908 discloses a method for tracing utility lines and locating other buried objects wherein an underground conductor is provided in the vicinity of the buried utility line and passive markers are disposed adjacent and alongside the conductor. An alternating current signal is applied to the conductor allowing the conductor to be traced as indicated above in the case of a tracing wire. A receiver when swung to and fro laterally of the energized conductor will normally produce an output having a peak-null-peak sequence. The passive marker has a tuned circuit that is tuned to the alternating current signal so that the output of the receiver presents a peak when the receiver reaches a point where a null should be produced to provide a precise location of the passive marker. This method has the same shortcomings as those noted for the tracing wire method.

SUMMARY OF THE INVENTION

The invention presented herein retains the visible warning feature of the prior art marking tape, the traceability of tracing wire, and is usable with passive markers. Unlike the prior art approaches that have been discussed, the present invention also provides a marking tape wherein it is possible to determine the location of a break in the marking tape at a point remote from the break. The marking tape embodying the invention includes a length of plastic tape; at least one pair of closely spaced, parallel, insulated conductors carried by and extending the length of the tape wherein the conductors are wires; and at least one other insulated conductor carried by and extending the length of the tape and separated from the one pair of conductors at a distance that is greater than the distance between the conductors of the pair of conductors. In another embodiment a second pair of wires, similar to the other pair of wires, is used in place of the other insulated conductor which makes it possible to determine whether a break detected in one pair is also present in the other pair, the presence of a break in both pairs indicating that a possible break in the tape due to an excavation operation.

Providing the marking tape with at least one pair of closely spaced, parallel insulated wires makes it possible to use a method to determine the location of a break in the wire pair. The method includes the steps of making a capacitive measurement at one end of the pair of wires and since the wire pair, as constructed, presents a uniform capacitance per unit length along its length, the distance from the capacitive measurement to the break can be calculated from the capacitive measurement and the capacitance per unit length of the wire pair. In the case of the embodiment having two pairs of wires, two capacitive measurements, one on each pair of wires, can be made at a measuring point with the results averaged to obtain a more accurate measure of the distance to a break from a measuring point.

Another embodiment is provided that further includes a plurality of passive markers, each of which includes an inductive coil and capacitance. The passive markers are secured to the tape at spaced intervals and are positioned relative to the conductors carried by the tape to be electromagnetically coupled to the conductors so that the electromagnetic field due to alternating current flow in both directions will be coupled to the passive markers to cause a passive marker to create an electromagnetic field that is greater than would be established if the marker was coupled to respond to current in only one direction.

The invention presented herein provides a method for tracing a marking tape that is placed underground wherein stronger electromagnetic signals are created along the tape since the method uses conductors for outgoing current and return current serving to avoid the shortcomings present when tracing a wire that uses the "common mode" current, i.e., current returning through ground or some other common return path. The method for tracing such marking tape herein includes the steps of providing at least one pair of closely spaced, parallel conductors carried by and extending the length of the tape wherein the conductors are wires; providing at least one other insulated conductor carried by and extending the length of the tape and separated from the one pair of conductors at a distance that is greater than the distance between the conductors of the one pair of conductors; connecting the one pair of conductors and the other conductor together at one end of the tape; applying an alternating current at a given frequency at the other end of the tape between at least one conductor of the one pair of conductors and the other conductor for establishing an electromagnetic field along the one pair of conductors and along the other conductor; and moving a receiver having an antenna and capable of receiving the given frequency and communicating to an operator the strength of the received signal along the marking tape and swinging the receiver laterally of same to obtain a peak-null-peak signal as an indication that the operator is over the tape.

The advantage provided by the foregoing method wherein a stronger electromagnetic field is established along the marking tape by the differential current provided by the outgoing current conductor and the return current conductor than is provided when a "common mode" current arrangement is used as in the prior art extends to the method for the detection of various specific points along a marking tape that is placed underground while tracing the marking tape. Such method for tracing a marking tape that is placed underground and locating specific points along the marking tape includes the steps of providing at least one pair of closely spaced, parallel conductors carried by and extending the length of the tape wherein the conductors are wires; providing at least one other insulated conductor carried by and extending the length of the tape and separated from the one pair of conductors at a distance that is greater than the distance between the conductors of the one pair of conductors; placing a passive marker at each specific point along the marking tape to be located subsequent to placement of the marking tape underground, each passive marker having an inductor-capacitor connected to form a resonant circuit of a selected frequency with the passive marker at each specific point along the marker placed to establish electromagnetic coupling with the one pair of conductors and with the other conductor; connecting the one pair of conductors and the other conductor together at one end of the tape; applying an alternating current at the selected frequency at the other end of the tape between at least one conductor of the one pair of conductors and the other conductor for establishing an electromagnetic field along the one pair of conductors and along the other conductor; and moving a receiver having an antenna and capable of receiving the selected frequency and communicating to an operator the strength of the receiving signal, along the marking tape and swinging the receiver laterally of same to obtain a peak-null-peak signal as an indication that the operator is over the tape and to obtain a signal in the region where there would be a null as an indication of the presence of a passive marker.

For purposes of the invention presented herein, the term "wire" means a solid or metalized fiber conductor or a stranded group of solid or metalized fiber conductors having a low resistance to current flow, together with any associated insulation and wherein the cross-section shape is selected to provide a low capacitance between the wire and ground.

BRIEF DESCRIPTION OF THE DRAWING

The foregoing features and advantages of the invention presented herein will be apparent from the following detailed description presented in conjunction with the accompanying drawing, wherein.

DETAILED DESCRIPTION

Figure 1:
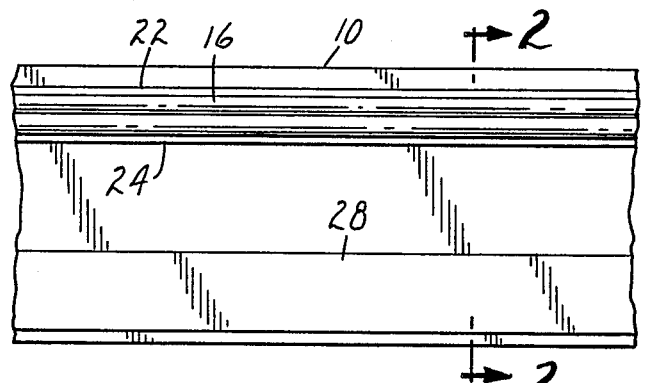
FIG. 1 a plan view of a marking tape embodying the invention.
Figure 2:
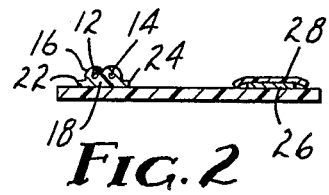
FIG. 2 is a cross-sectional view of the marking tape of FIG. 1 taken along line 2—2 of FIG. 1.

Referring to FIGS. 1 and 2 of the drawing, a marking tape embodying the invention is shown including a length of tape 10 which carries two wires 12 and 14 that are closely spaced parallel to one another and are insulated from one another by insulation 16 that surrounds each of the wires with the insulation 16 formed to provide a flat portion 18 that includes two flanges 22 and 24 extending outwardly from and along the wires 12 and 14, respectively. With wires 12 and 14 so positioned relative to each other, they will present a uniform capacitance per unit length, a feature that is used in the present invention. The flat portion 18 provides a surface for contact between the insulation 16 and the surface of the tape 10 to enable the insulation 16 to be secured to the tape such as by the use of a suitable adhesive or preferably by the use of pressure and vibration. The marking tape structure of FIGS. 1 and 2 also includes a conductor 26 that can be provided by a metal foil which is protected by a narrow strip of insulative material 28, similar to that used for the tape 10. The strip of material 28 is wider than the conductor 26 and runs the length of conductor 26. The strip 28 is secured to the tape 10 by a suitable adhesive or, as in the case of the insulation 16, is secured to the tape by the use of pressure and vibration. The wires 12 and 14 are spaced from the conductor 26 at a distance that is greater than the distance between wires 12 and 14. This enables a passive marker that includes an inductive coil and capacitor connected to form a resonant circuit having a desired resonant frequency to be secured to the tape 10 so that electromagnetic coupling is provided with the wires 12 and 14 by one portion of the passive marker coil with another portion of the coil being electromagnetically coupled to the conductor 26.

Figure 3:
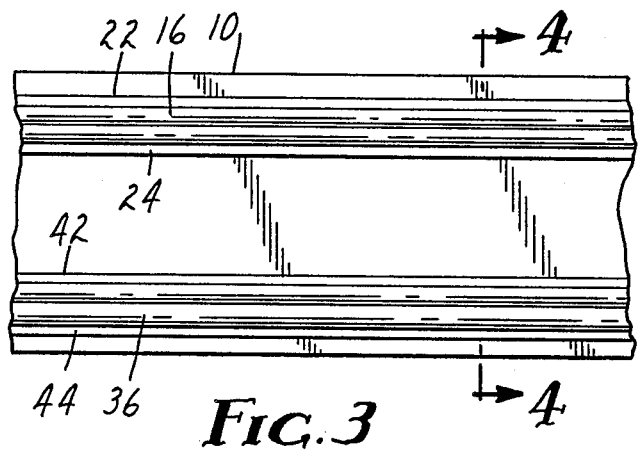
FIG. 3 is a plan view of another marking tape structure embodying the invention.
Figure 4:
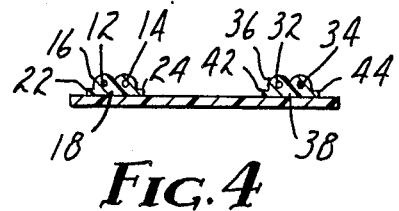
FIG. 4 is a cross-sectional view of the marking tape of FIG. 3 taken along line 4—4 in FIG. 3.

Referring to FIGS. 3 and 4, another marking tape is shown embodying the invention. It includes some of the structure described for the marking tape of FIGS. 1 and 2. The elements of the marking tape of FIG. 3 that correspond to like elements of the marking tape of FIGS. 1 and 2 are identified by the same reference numerals. Like the marking tape of FIGS. 1 and 2, it includes a length of tape 10 with two wires 12 and 14 that are closely spaced and parallel to one another and are insulated from one another by insulation 16 that surrounds each of the wires with the insulation 16 formed to provide a flat portion 18 that includes two flanges 22 and 24 extending outwardly from and along the wires 12 and 14, respectively. This two wire structure can be secured to the tape 10 as described in connection with FIGS. 1 and 2. A similar two wire structure is used in place of the conductor 26 that forms a part of the marking tape of FIGS. 1 and 2. The additional two wire structure includes wires 32 and 34, insulation 36 formed about the wires 32 and 34 and providing a flat portion 38 that includes two flanges 42 and 44 which extend outwardly from and along the wires 32 and 34, respectively. This two wire structure for wires 32 and 34 is secured to the tape in the same manner as the two wire structure for wires 12 and 14. The wires 12 and 14 are spaced from the wires 32 and 34 such that a passive marker that includes an inductive coil and capacitor connected to form a resonant circuit having a desired resonant frequency can be secured to the tape 10 so that electromagnetic coupling is provided with the wires 12 and 14 by one portion of the passive marker coil with another portion of the coil electromagnetically coupled to the conductor 26.

Figure 5:
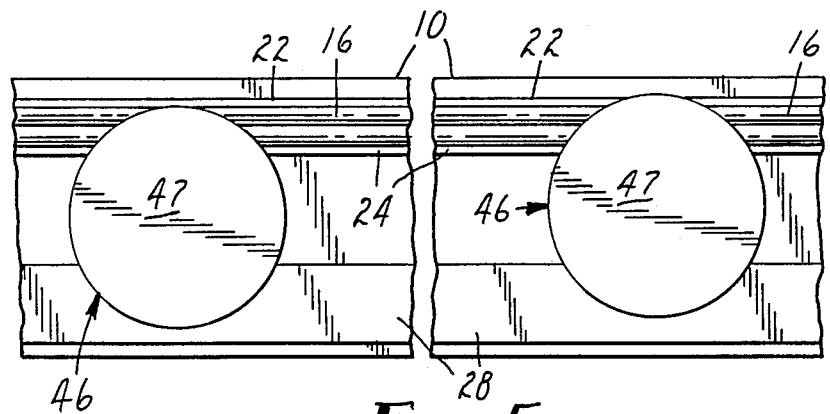
FIG. 5 is a plan view of the marking tape of FIG. 1 with passive markers carried by the tape at spaced intervals along the tape.

FIG. 5 shows a marking tape and passive marker combination that includes the marking tape structure of FIGS. 1 and 2 with passive markers 46 secured to the tape 1 and positioned between and overlapping the conductor portions of FIG. 1 indicated at 16 and 28 to provide the desired electromagnetic coupling mentioned earlier.

Figure 6:
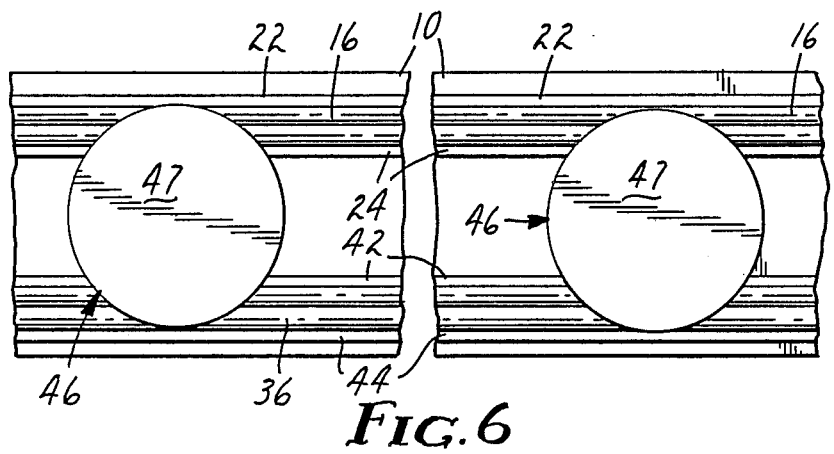
FIG. 6 is a plan view of the marking tape of FIG. 3 with passive markers carried by the tape at spaced intervals along the tape.

Similarly, FIG. 6 shows a marking tape and passive marker combination that includes the marking tape structure of FIGS. 3 and 4 with passive marker 46 secured to the tape 10 and positioned between and overlapping the conductor portions indicated at 16 and 36 to provide the desired electromagnetic coupling.

Figure 7:
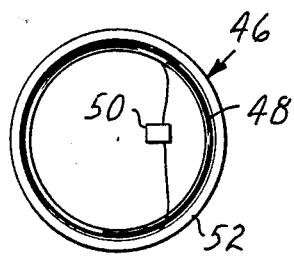
FIG. 7 is a plan view of one of the passive markers of FIGS. 5 and 6 with a portion removed.

Referring to FIG. 7, a passive marker 46 used in the structure of FIGS. 5 and 6 is shown with its cover removed to disclose the resonant circuit for the marker that is provided by an inductive coil 48 and capacitor 50. The housing for the coil 48 and capacitor 50 of the passive marker 46 is shown in the form of a hollow disc shaped housing formed from a shallow cup shaped member 52 to which a cover 47, shown in FIGS. 5 and 6, is secured to provide a sealed housing.

Figure 8:
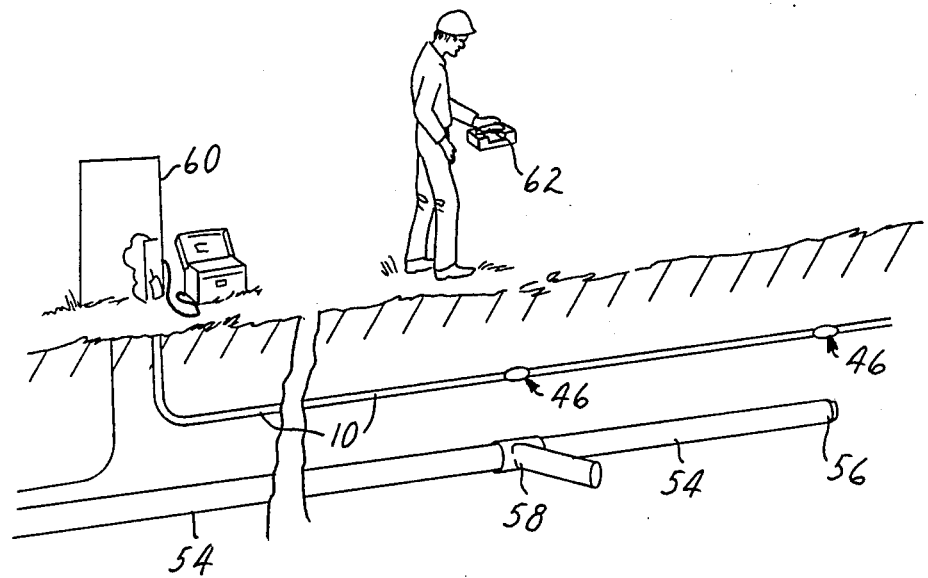
FIG. 8 depicts the use of any of the marking tapes of the drawing with an underground utility line.

The use of the marking tape embodying the invention is illustrated in FIG. 8. For purposes of illustration, a marking tape, as described in connection with FIG. 6, is used. An underground utility line 54, such as a gas line, is shown that is terminated at the end 56 and has a stub tee 58 positioned at one point along the line. The marking tape 10 of FIG. 6 is placed underground above the line 54 with at least one end accessible above ground at a test point 60. Passive markers 46 are positioned along the marking tape 10 with one above the stub tee 58 and another above the end 56. With the passive markers so place, it is possible, as will be described, to determine the position of the markers 46 from a point above the markers and thus locate the stub tee 58 and end 56 when desired. The wires 14 and 16 and wires 34 and 36 of the tape 10 are connected together at the end away from the test point 60 so that the wires 14, 16, 34 and 36 provide a continuous circuit with each pair functioning as a single continuous conductor. With this arrangement it is possible, when it is desired to trace the marking tape and locate one or more of the passive markers, to connect an alternating current signal generator to the circuit at the test point 60 having a signal output at the resonant frequency of the passive markers 46. The tape and the markers along the tape can then be located by the use of receiver 62 having an antenna which is capable of receiving an electromagnetic signal at the frequency of the transmitted signal and communicating to an operator the strength of a received signal. Signal generators and receivers of this type are commercially available. A model 500 cable locator that is available from the Minnesota Mining and Manufacturing Company, St. Paul, Minn., U.S.A. provides such a signal generator and receiver. The alternating current signal applied between the pairs of wires at test point 60 causes an electromagnetic field to be produced about each of the pairs of wires and the signal is also electromagnetically coupled to the passive markers 46 by the wires 14 and 16 and by the wires 34 and 36 so that the outgoing and return signal is coupled to the markers 46. The resonant circuit for each marker 46 generates an electromagnetic field at the same frequency as the alternating current signal applied to the circuit provided by the marking tape structure but at a different orientation than the electromagnetic field produced by the current flow in the tape structure circuit. The receiver 62 is swung laterally of the tape 10 and at equal distance on either side of the tape. The receiver 62 will respond to the electromagnetic field established by the signal applied at the test point 60. Peak signals will be detected when the receiver 62 is on either side of the tape during a swing with a null presented when the receiver is directly over the tape 10. These signals are communicated to the operator of the receiver enabling the operator to trace the tape 10. When a passive marker 10 is reached, the pattern of the electromagnetic signal detected by the receiver 62 is altered in that a signal is detected during the portion swing where a null would have been expected. This method for tracing an underground conductor and locating passive markers located with the conductor is in accordance with the teachings of U.S. Pat. No. 4,119,908 to Armond D. Cosman, except that the marking tape of this invention does not use a ground return, but uses two metallic conductive paths to complete the circuit loop for the test or locating signal. Using this differential current mode serves to provide an electromagnetic signal for detection that is greater than that provided by a circuit using a ground or common mode for current flow.

Since the tape 10 will normally present a continuous circuit, such continuity can be monitored from one end of the tape such as the test point 60 or at a point remote from test point 60. The loss of such continuity indicates the circuit has been broken in at least one point. Assuming the tape and the wires 14, 16, 34 and 36 have been broken, which could be the case due to an excavation being made where the tape is located, the continuity presented prior to the break would be lost. A capacitive measurement can then be made by connecting a capacitive measuring instrument between wires 14 and 16 at the test point 60. Since the wires 14 and 16 will present an opening at the break and are positioned with a uniform spacing between the wires with the wires fully insulated, the wires 14 and 16 will present a known capacitance per unit length. With the capacitance measured and the capacitance per unit length known, the distance to the break in wires 14 and 16 can be calculated. A similar measurement can be made with respect to wires 34 and 36 and the distance to the break in wires 34 and 36 calculated. The average of the two calculated distances will then provide an accurate measurement of the distance to the break. Additional similar measurements can be made back to the break from a test point on the far side of the break serving to more accurately establish the location of the break as well as establishing whether a second break exists beyond the initial located break.

The marking tape structure of FIG. 6 also allows a continuity test to be made of wires 14 and 16 and wires 34 and 36 which are connected at the end of the tape away from the test point 60. This will make it possible to determine whether a break in the continuity of the circuit provided by wires 14 and 16 connected with wires 34 and 36 exists only with respect to wires 14 and 16 or also with wires 34 and 36. A break only in wires 14 and/or 16 or only in wires 34 and/or 36 might be due to damage caused by a rodent as opposed to a full break that could be expected when an excavation is made above an underground utility line with which the tape is used.

The marking tape structure shown in FIG. 5 can be used as described for the tape structure of FIG. 6 in connection with FIG. 7. The marking tape structure of FIG. 5, as set forth in greater detail in FIG. 2, has the circuit used in FIG. 8 completed by the wires 14 and 16 conducting as a single wire and the single conductor 26. This arrangement does not allow measurements to be made which would serve to determine whether a break in the circuit was present in wires 14 and 16 plus conductor 26. It does, however, provide for energization of markers 46 by both outgoing and return current and also makes it possible to determine the distance to a break in wires 14 and 16 by a capacitance measurement made between wires 14 and 16.

The material used for tape 10 can be made from a wide variety of plastic materials, desirable such plastic material which exhibit long term stability under various underground conditions are preferred. Typical suitable materials are polyvinyl chloride, polyethylene, polyester and the like. The tape can be colored and, if the material selected is printable, information can be provided on the tape to bring the tape to the attention of someone excavating where the tape is buried and identify the type of utility line and thus avoid damage to the utility line with which the tape is used. The material used for insulation for the conductors of the tape structure of the present invention should be selected from materials which also exhibit long term stability under various underground conditions.

The particulars of the foregoing description are provided merely for purposes of illustration and are subject to a considerable latitude of modification without departing from the novel teachings disclosed therein. For example, all of the various wires need not be positioned on one side of the marking tape 10 as shown in the drawing. Similarly, while the passive markers 46 in the drawing are shown with a circularly shaped coil 48, other structural forms can be used for a passive marker that provide the function of the passive markers 46. Accordingly, the scope of this invention is intended to be limited only as defined in the appended claims, which should be accorded a breadth of interpretation consistent with this specification.

We claim:

1. A marking tape for placement underground including:
    at least one pair of closely spaced, parallel, insulated conductors carried by and extending the length of the tape wherein the conductors are wires; and at least one other insulated conductor carried by and extending the length of the tape without any conductors similar to and positioned between said one pair of conductors and said other conductor, said other conductor positioned away from said one pair of conductors at a distance that is greater than the distance between the conductors of said pair of conductors.

2. A marking tape according to claim 1 wherein said other conductor is a wire.

3. A marking tape according to claim 1 wherein said other conductor is a metal foil.

4. A marking tape according to claim 1 wherein said other conductor is an insulated wire and the marking tape further including an insulated wire closely spaced, parallel to said other conductor and carried by said tape and extending the length of said tape.

5. A marking tape according to claim 1 wherein said one pair of wires has common, uniform insulation between said wires.

6. A marking tape according to claim 1 wherein said insulated conductors include insulation presenting a flat base wherein said flat base is secured to the tape.

7. A marking tape according to claim 1 wherein a plurality of passive markers, each having an inductive coil, are carried by the tape and are spaced along the tape with said inductive coil of each of said passive markers extending between said pair of conductors and said other conductor to provide electromagnetic coupling with a portion of said pair of conductors and a portion of said other conductor.

8. A method of tracing a marking tape that is placed underground including the steps of:
    providing at least one pair of closely spaced, parallel conductors carried by and extending the length of the tape wherein the conductors are wires;
    providing at least one other insulated conductor carried by and extending the length of the tape and separated from said one pair of conductors at a distance that is greater than the distance between the conductors of said one pair of conductors;
    connecting said one pair of conductors and said one other conductor together at one end of the tape;
    applying an alternating current at a given frequency at the other end of said tape between at least one conductor of said one pair of conductors and said other conductor for establishing an electromagnetic field along said one pair of conductors and along said one other conductor; and
    moving a receiver having an antenna and capable of receiving said given frequency and communicating to an operator the strength of the received signal along the marking tape and swinging the receiver laterally of same to obtain a peak-null-peak signal as an indication that the operator is over the tape.

9. A method for tracing a marking tape that is placed underground and locating specific points along the marking tape includes the steps of:
- providing at least one pair of closely spaced, parallel conductors carried by and extending the length of the tape wherein the conductors are wires;
- providing at least one other insulated conductor carried by and extending the length of the tape and separated from said one pair of conductors at a distance that is greater than the distance between the conductors of said one pair of conductors;
- placing a passive marker at each specific point along the marking tape to be located subsequent to placement of the marking tape underground, said passive marker having an inductor-capacitor connected to form a resonant circuit of a selected frequency with said passive marker at each specific point along the marker placed to establish electromagnetic coupling with said one pair of conductors and with said other conductor;
- connecting said one pair of conductors and said one other conductor together at one end of the tape;
- applying an alternating current at said selected frequency at the other end of said tape between at least one conductor of said one pair of conductors and said other conductor for establishing an electromagnetic field along said one pair of conductors and along said one other conductor; and
- moving a receiver having an antenna and capable of receiving said given frequency and communicating to an operator the strength of the received signal along the marking tape and swinging the receiver laterally of same to obtain a peak-null-peak signal as an indication that the operator is over the tape and to obtain a signal in the region where there would be a null as an indication of the presence of said passive marker.

10. A method for determining the distance from a measuring point to a break in a marking tape that is placed underground including the steps of:
- providing at least one pair of closely spaced conductors carried by and extending the length of the tape, said pair of conductors presenting a known capacitance per unit length and wherein the conductors are wires that are severed when the marking tape is severed;
- measuring the capacitance presented by said pair of conductors when a break in the tape is known or suspected, such measurement being made from the end of said pair of conductors away from the known or suspected break in the tape; and
- calculating the distance from the point of measurement of the capacitance using the measured capacitance and the known capacitance per unit length of said pair of conductors.

11. A method of tracing a marking tape that is placed underground including the steps of:
- providing at least one current conducting path carried by and extending the length of the tape;
- providing at least one other current conducting path carried by and extending the length of the tape and spaced from said one current conducting path;
- connecting said one current conducting path and said other current conducting path together at one end of the tape;
- applying an alternating current at a given frequency at the other end of said tape between said one current conducting path and said other current conducting path for establishing an electromagnetic field along said one current conducting path and along said other current conducting path; and
- moving a receiver having an antenna and capable of receiving said given frequency and communicating to an operator the strength of the received signal along the marking tape and swinging the receiver laterally of same to obtain a peak-null-peak signal as an indication that the operator is over the tape.

12. A method for tracing a marking tape that is placed underground and locating specific points along the marking tape includes the steps of:
- providing at least one current conducting path carried by and extending the length of the tape;
- providing at least one other current conducting path carried by and extending the length of the tape and separated from said one current conducting path;
- placing a passive marker at each specific point along the marking tape to be located subsequent to placement of the marking tape underground, said passive marker having an inductor-capacitor connected to form a resonant circuit of a selected frequency with said passive marker at each specific point along the marker placed to establish electromagnetic coupling with said one current conducting path and with said other current conducting path;
- connecting said one current conducting path and said other current conducting path together at one end of the tape;
- applying an alternating current at said selected frequency at the other end of said tape between said one current conducting path and said other current conducting path for establishing an electromagnetic field along said one current conducting path and along said other current conducting path; and
- moving a receiver having an antenna and capable of receiving said given frequency and communicating to an operator the strength of the received signal along the marking tape and swinging the receiver laterally of same to obtain a peak-null-peak signal as an indication that the operator is over the tape and to obtain a signal in the region where there would be a null as an indication of the presence of said passive marker.

* * * * *